(12) United States Patent
Gao

(10) Patent No.: US 8,724,242 B2
(45) Date of Patent: May 13, 2014

(54) COMPENSATION FOR CROSS-TRACK DEVIATION

(75) Inventor: Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 359 days.

(21) Appl. No.: 13/019,518

(22) Filed: Feb. 2, 2011

(65) Prior Publication Data
US 2012/0194945 A1 Aug. 2, 2012

(51) Int. Cl.
*G11B 27/36* (2006.01)
*G11B 21/02* (2006.01)

(52) U.S. Cl.
USPC .............................. 360/31; 360/75

(58) Field of Classification Search
None
See application file for complete search history.

(56) References Cited

U.S. PATENT DOCUMENTS

| | | | |
|---|---|---|---|
| 4,656,546 A | 4/1987 | Mallory | |
| 6,021,024 A | 2/2000 | Akiyama et al. | |
| 6,504,675 B1 | 1/2003 | Shukh et al. | |
| 6,771,441 B2 | 8/2004 | Tang et al. | |
| 6,785,071 B2 * | 8/2004 | Elliott et al. | 360/29 |
| 6,882,488 B1 | 4/2005 | Albrecht et al. | |
| 6,954,340 B2 | 10/2005 | Shukh et al. | |
| 7,072,147 B2 | 7/2006 | Limmer et al. | |
| 7,126,773 B1 | 10/2006 | Taratorin | |
| 7,251,878 B2 | 8/2007 | Le et al. | |
| 7,253,992 B2 | 8/2007 | Chen et al. | |
| 7,265,941 B2 | 9/2007 | Le et al. | |
| 7,352,526 B2 | 4/2008 | Takaishi | |
| 7,429,857 B2 | 9/2008 | Guzik et al. | |
| 7,430,095 B2 | 9/2008 | Benakli et al. | |
| 7,436,632 B2 | 10/2008 | Li et al. | |
| 7,639,445 B2 * | 12/2009 | Matsunaga et al. | 360/75 |
| 2002/0054449 A1 * | 5/2002 | Despain et al. | 360/77.07 |
| 2005/0237650 A1 * | 10/2005 | Ehrlich | 360/60 |
| 2009/0002896 A1 * | 1/2009 | Mallary et al. | 360/319 |
| 2009/0284874 A1 | 11/2009 | Yin et al. | |
| 2010/0110575 A1 | 5/2010 | Gao | |
| 2010/0118433 A1 * | 5/2010 | Buch | 360/75 |
| 2011/0102930 A1 * | 5/2011 | Johnston et al. | 360/55 |

OTHER PUBLICATIONS

Meloche, Eric, "Perpendicular Recording at High Areal Densities," Seagate, Feb. 14, 2008, 41 pages.

* cited by examiner

*Primary Examiner* — Regina N Holder
(74) *Attorney, Agent, or Firm* — HolzerIPLaw, PC (57) ABSTRACT

Cross-track deviation of a writer from a predetermined track on a recording medium is detected. A write current is adjusted based on the cross-track deviation of the writer from the predetermined track. The adjusted write current is applied to the writer to compensate for the cross-track deviation of the writer from the predetermined track.

20 Claims, 7 Drawing Sheets

COMPENSATION FOR CROSS-TRACK DEVIATION

SUMMARY

A system includes alignment sensor circuitry configured to detect a cross-track deviation of a writer relative to one or more target tracks on a recording medium and write current control circuitry configured to modulate a write current supplied to the writer based on the detected cross-track deviation. Other implementations are also described and recited herein.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

DETAILED DESCRIPTION

Bit Patterned Media (BPM) refers to a magnetic storage technology used to record data in a consistent array of magnetic cells structurally formed in a storage medium. The BPM cells may be pre-patterned through various procedures such as, but not limited to, photolithography, ion-milling, etc. For example, each magnetic cell may be pre-patterned in the storage medium using photolithography by which a mask pattern is recorded using high-resolution electron beam. The mask pattern is used to selectively etch the magnetic cells in magnetic material deposited on the surface of the storage medium. In one implementation, each magnetic cell stores a single bit and is isolated from all other cells by a finite, non-magnetic region of the storage medium.

Data is stored in the individual cells along consistent bit tracks, which are typically patterned into the storage medium at concentric radial positions (e.g., from an inner diameter (ID) to an outer diameter (OD) of the storage medium). As the storage medium rotates in a storage device, a transducer head is positioned in close proximity to the storage medium surface along a data track to read data from and write data to the individual cells in the track. The transducer head, however, may drift from perfect cross-track alignment over the target bit track, which can result in improperly written data and therefore stored data corruption. Accordingly, the described technology contributes to maintaining proper transducer head tracking and accurate data writing in a storage device.

To assist in maintaining alignment along one or more target bit tracks while writing to a storage medium, a transducer head's position relative to the one or more bit tracks can be continuously corrected as the storage medium rotates. In one implementation, the position of the transducer head is read from position data recorded on the storage medium to determine the position variation (e.g., from the intended position). Using the position variation information, the position of the transducer head can then be adjusted by an actuator arm accordingly as the storage medium rotates. Nevertheless, the mechanical positioning of the transducer head to any target magnetic cells in a bit track may still vary by a small amount in the cross track direction. Cross-track direction refers to the radial width of a bit track (e.g., from the innermost radial extent of the bit track to the outermost radial extent of the bit track). In contrast, down-track direction refers to the direction along a bit track as the storage medium rotates (e.g., along the circumference of the bit track). Accordingly, in addition to mechanical position adjustment, the write current to the transducer head can also be adjusted based a readback signal detected from the storage medium by the transducer to compensate for misalignment of the transducer head with respect to bit tracks on the storage medium.

The position of a transducer head over the media is relevant to the correct writing of data to patterned bits on a disc. If the write pole of the transducer head drifts to far cross-track in relation to the target bit track as the media spins, data may not be correctly written to the targeted patterned bits on the disc.

Generally, the write current generates a magnetic "write bubble" emanating from a write pole on the transducer head. As the write pole passes over the magnetic cells in the BPM, the write bubble sets the polarity of the magnetic domains in the cells. The dimensions of the write bubble vary with the amplitude of the write current (e.g., the larger the write current, the larger the write bubble in both the down track and cross track dimensions). As such, when the write current is modulated based on the position information detected by the transducer head with respect to the one or more target bit tracks, the write bubble changes in size as a result of the modulated write current. In this manner, the area of the storage medium that is written by the write bubble can be varied to account for misalignment without requiring additional mechanical adjustment of the position of the write pole. Position information regarding the transducer head with respect to the bit patterned media may be obtained from read sensors, bit detectors, and/or other types of sensors (collectively, also referred to as "alignment sensors"). According to the presently disclosed technology, write current is modulated based on the measured/detected cross-track deviation of the transducer head relative to the target bit track to compensate for drift of the transducer head. Modulation of the write current adjusts the size of the write bubble so as to improve the writing of data to the targeted bits on the recording medium.

Figure 1:
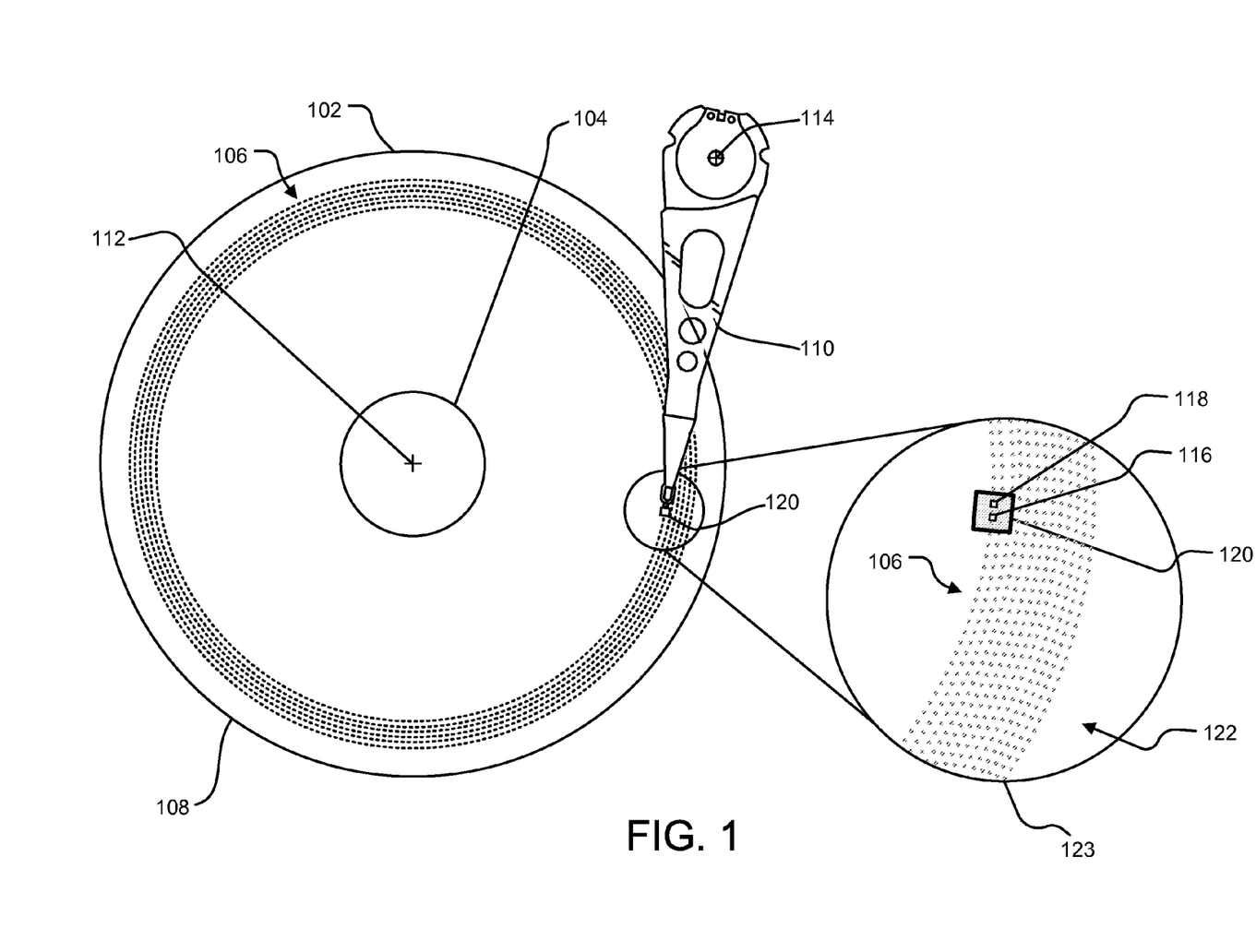
FIG. 1 illustrates a plan view of an example implementation of a BPM storage disc with a transducer head situated on an end of an actuator assembly.

FIG. 1 illustrates a plan view of an example implementation of a BPM disc 108 with a transducer head 120 situated on an end of an actuator assembly 110. The disc 108 rotates about a disc axis of rotation 112 during operation. Further, disc 108 includes an outer diameter 102 and inner diameter 104 between which are a number of concentric bit tracks 106, illustrated by circular dashed lines. Bit tracks 106 are substantially circular and are made up of regularly spaced patterned bits 122, indicated as dots or ovals on disc 108 as well as in the exploded view 123.

Information may be written to and read from the patterned bits 122 on the disc 108 in different bit tracks 106. The transducer head 120 is mounted on the actuator assembly 110 at an end distal to the actuator axis of rotation 114 and flies in close proximity above the surface of the disc 108 during disc operation. The actuator assembly 110 rotates during a seek operation about an actuator axis of rotation 114 positioned adjacent to the disc 108. The seek operation positions the transducer head 120 over a target bit track. The exploded view 123 shows the transducer head with a read sensor 116 and a writer 118 (shown as a write pole) relative to the bit tracks 106 (with the actuator assembly 110 omitted).

In one implementation, the transducer head 120 utilizes the read sensor 116 as an alignment sensor to perform a read-while-writing process. During the read-while-writing process, the read sensor 116 is turned on such that it reads while the writer 118 is writing. The read-while-writing process allows the read sensor 116 to determine the cross-track deviation of the transducer head 120 over the desired bit track 106 while the writer 118 is in operation. The read-while-writing process may be performed by reading magnetic signals from the patterned bits 122 on the disc 108 and determining from the detected signals a cross-track deviation of the writer 118 of the transducer head 120 with respect to the desired bit track 106.

In another implementation the transducer head 120 utilizes the read sensor 116 as an alignment sensor to perform a read-before-writing process. During the read-before-writing process, the read sensor is turned on before the writer is turns on. The read-before-writing process allows the read sensor 116 to determine the cross-track deviation of the transducer head 120 over the desired bit track 106 before the writer 118 writes. The read-before-writing process may be performed by reading magnetic signals from the patterned bits 122 on the disc 108 and determining from the detected data the cross-track deviation of the writer 118 of the transducer head 120 with respect to the desired bit track 106.

In another implementation, the transducer head 120 includes one or more bit detectors. A bit detector acts as an alignment sensor in lieu of or in addition to the read sensor 116 and improves the accuracy and speed with which the cross-track deviation of the writer 118 can be determined from a waveform reflected from the patterned bits 122 to the transducer head 120.

In yet another implementation, the transducer head 120 includes one or more electrical wires containing spin-polarized currents which function as a spin angular momentum sensor. A spin angular momentum sensor acts as an alignment sensor in lieu of or in addition to the read sensor 116 and offers improved accuracy and speed in determining a cross-track deviation of the writer 118 by detecting changes in spin properties of the one or more spin-polarized currents when the electrical wires pass in close proximity to the patterned bits 122.

Through these and other implementations of an alignment sensor, the storage device can detect a misalignment between the alignment sensor and the target bit track (e.g., the sequence of patterned bits 122 in a target bit track), which can be indicated by a track mis-registration (TMR) value. The amount of mis-registration of a bit track impacts the ability of a write element to correctly store data in patterned bits 122 of the bit track. For example, if the writer 118 is sufficiently misaligned in the cross-track direction, the write bubble generated by the writer 118 may fail to sufficiently set the polarity of one or more magnetic cells in the track, thereby failing to correctly write the data. In the described technology, an alignment sensor on the transducer head can detect such misalignment and adjust the write current supplied to the writer 118. By increasing the write current, the cross-track width of the write bubble can be increased to accommodate the misalignment and correctly write to the magnetic cells in the target track. Likewise, when alignment is improved, the write current can be reduced accordingly.

Figure 2:
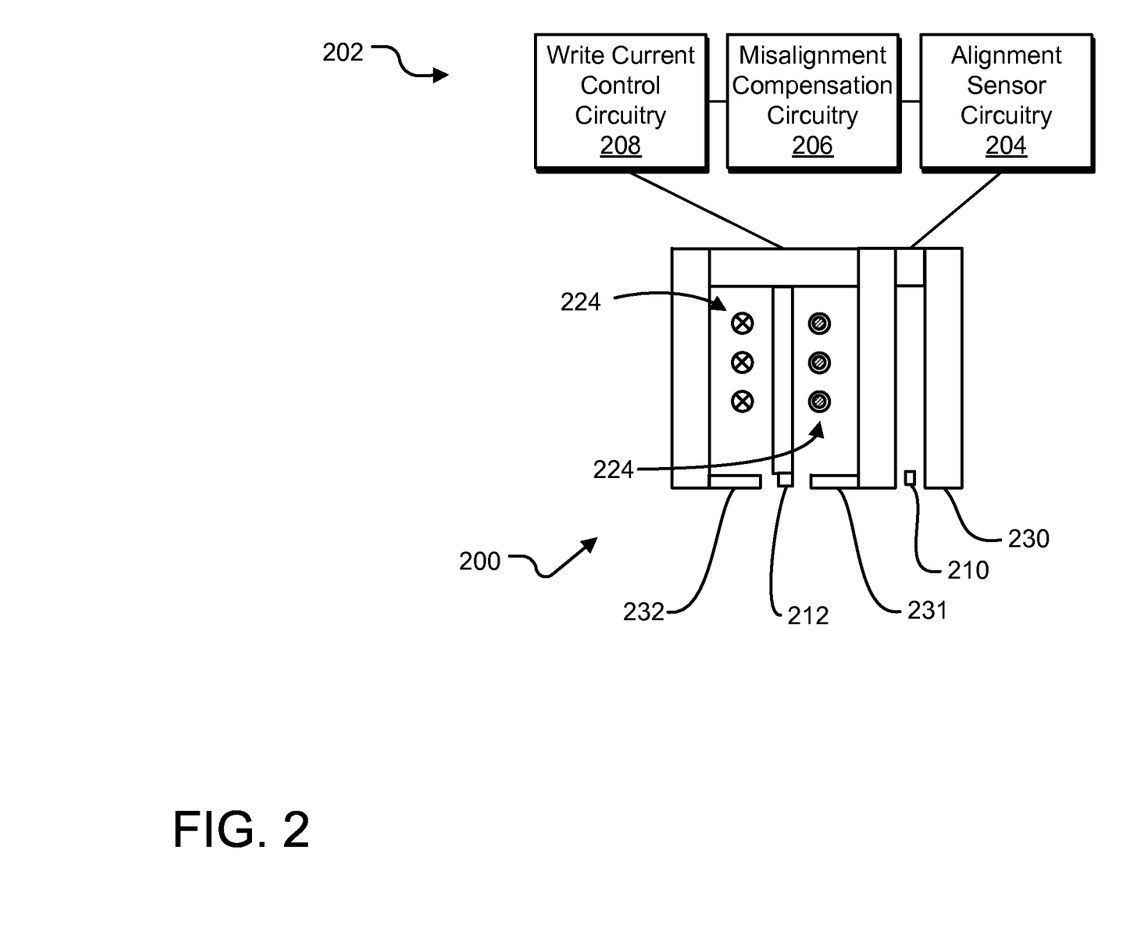
FIG. 2 illustrates a cross-sectional view of an example transducer head coupled to compensation circuitry.

FIG. 2 illustrates a cross-sectional view of an example transducer head 200 coupled to compensation circuitry 202, including alignment sensor circuitry 204, misalignment compensation circuitry 206, and write current control circuitry 208. The transducer head 200 is shown with the read sensor 210, the writer 212, and data signal wires 224 electrically connecting to the compensation circuitry 202. The read sensor 210 (which is an example of an alignment sensor) is configured to read signals from the patterned bits on the storage medium and detect misalignment between the transducer head 220 (and therefore the writer 212) and the target bit track. The writer 212 is configured to write data to the patterned bits in the same target bit track on the storage medium. The transducer head 200 also includes shields 230, 231, and 232.

In an implementation, compensation for cross-track deviation between the writer 212 and a target track is performed by compensation circuitry 202 located off of the transducer head 200. In another implementation, the compensation circuitry 202 is located on or within the transducer head 200. Combinations of off-head and on-head circuitry may also be employed. The data to be written to the patterned bits is sent from off-head electronics through the transducer head 220 to the writer 212. The amplitude of the write current used to write the data to the pattered bits is modulated by the write current control circuitry 208, as informed by the misalignment compensation circuitry 206 based on misalignment detection by the alignment sensor circuitry 204.

The read sensor 210 (or any alignment sensor) and the alignment sensor circuitry 204 detect and/or measure any misalignment of the transducer head 200 with the target track. Such detection or measurement is based on the magnetic fields the read sensor 210 monitors from the magnetic cells it passes in the target track as the storage medium spins. While the alignment sensor is reading or otherwise monitoring the magnetic cells in the track, the read signal amplitude varies with misalignment. For example, correct alignment can produce in the strongest read signal, while misalignment can reduce the read signal. This variation is typically represented as a Gaussian distribution, relative to perfect alignment. The alignment sensor circuitry 204 communicates a measure of the misalignment (e.g., the amplitude of the read signal) to the misalignment compensation circuitry 206. In one implementation, amplitude modulation may be used to determine whether the transducer head 200 is correctly aligned or how much the transducer head 200 is misaligned with the target track (e.g., what percentage of the track width), yielding a misalignment measure.

The misalignment compensation circuitry 206 uses this misalignment measure to determine a write current amplitude adequate to generate a write bubble from the writer 212 that is large enough to correctly write to the magnetic cells in the target bit track despite the misalignment. The misalignment sensor circuitry 206 communicates the write current amplitude to the write current control circuitry 208, which adjusts the amplitude of the write current it generates to adjust the dimensions of the write bubble of the writer 212.

In one implementation, the relationship among the misalignment measure and the write current amplitude is determined during calibration of the storage device. For example, calibration can develop a set of cross-track misalignments based on the readback signal method described with regard to the alignment sensor circuitry 204 and associate corresponding write currents that result in acceptable write performance by the misaligned transducer head. In an alternative implementation, calibration can yield a contour plot data that relates the X-Y-Z offsets (relative to the center of a target track and the fly height of the transducer head) to corresponding write currents that result in acceptable write performance. Typically, these example relationships are deterministic (e.g., based on calibration) and monotonic from the ideal alignment (e.g., from the center of the target bit track and the ideal fly height)

Figure 3:
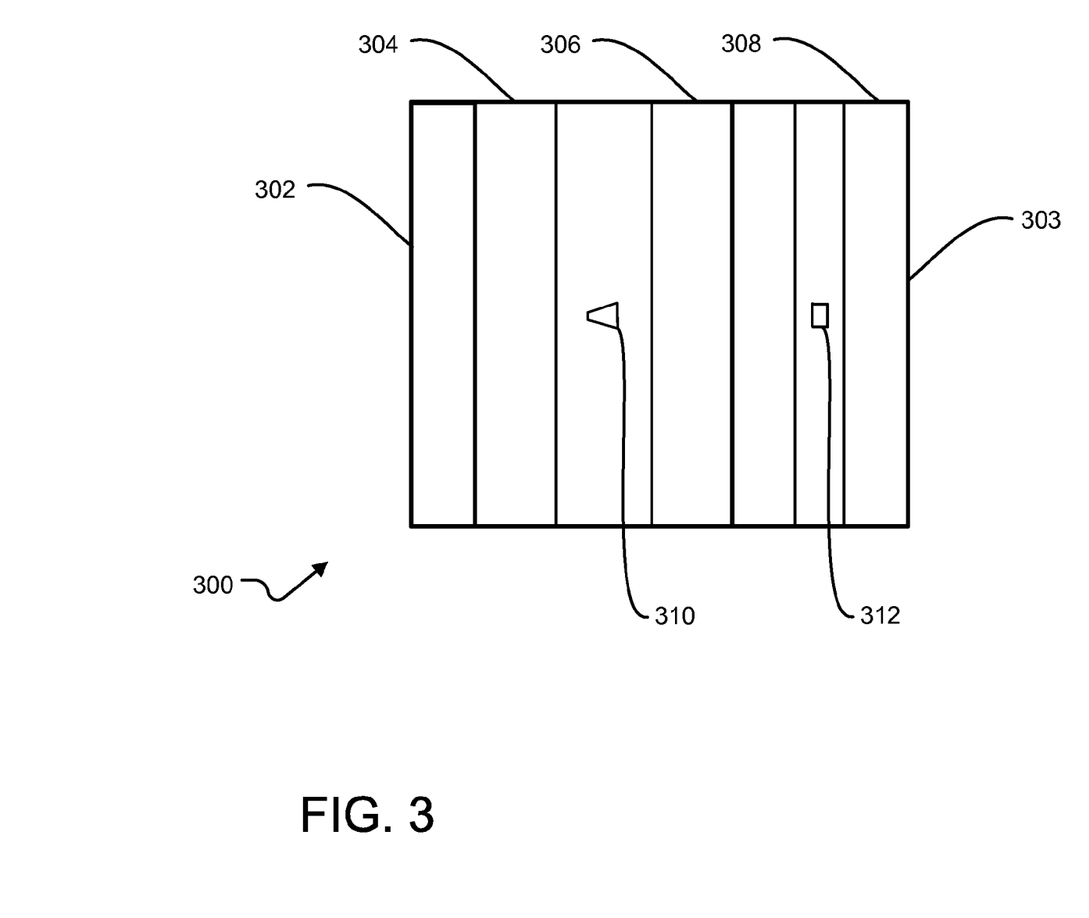
FIG. 3 illustrates a bottom view of an example transducer head used with compensation circuitry.

FIG. 3 illustrates a bottom view of an example transducer head 300 used with compensation circuitry (not shown). In the illustrated implementation, the writer 310 is positioned toward the leading edge 302 of the transducer head 300 and the read sensor 312 is positioned toward the trailing edge 303 of the transducer head 300, although other configurations are contemplated. Assorted shields 304, 306, and 308 are also positioned on the transducer head 300.

The illustrated surface of the transducer head 300 faces the surface of the storage medium (not shown) and "flies" above the surface of the storage medium as the storage medium spins. The read sensor 312 is capable of detecting the data stored in the magnetic cells on the surface of the storage medium. Such read data can be sent to the host and/or used to determine the position and/or alignment of the transducer head 300 relative to a target bit track. Further, the writer 310 is capable of generating a write bubble that can set a polarity in each of the magnetic cells on the surface of the storage medium. Alignment of the writer 310 to the target bit track (and therefore the magnetic cells that constitute the patterned bits on the storage medium) influences the integrity of the data that is written to the storage medium. An actuator arm (not shown) provides some alignment control in one implementation of the described technology. Furthermore, the amplitude of the write current provided to the writer 310 can also be adjusted to increase or decrease the cross-track width of the write bubble to compensate for all or some portion of detected misalignment. In addition, adjustment of the write current amplitude can also increase or decrease the down-track length of the write bubble to effectively synchronize the write pole with the read sensor.

Figure 4:
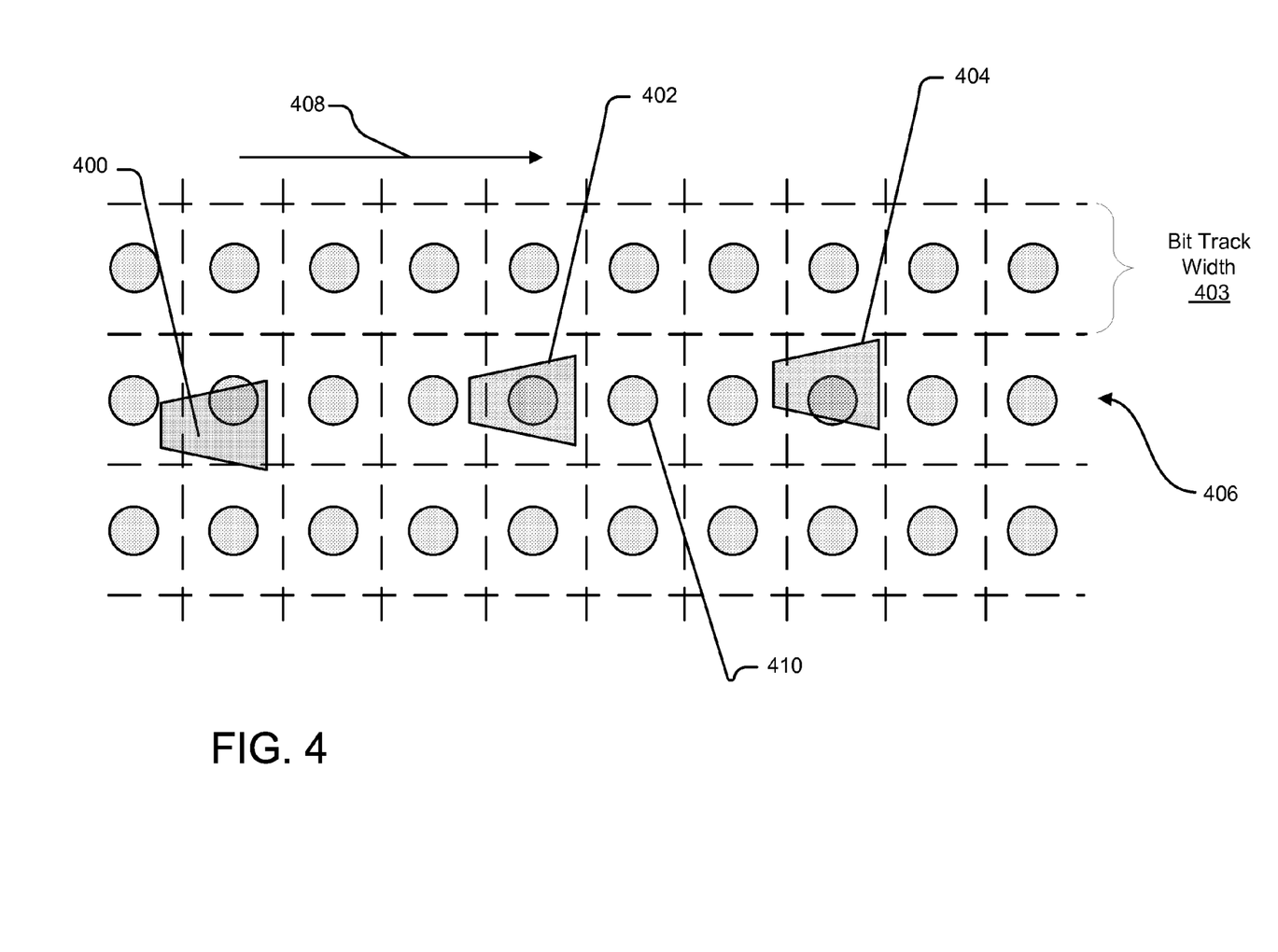
FIG. 4 illustrates multiple example instances of a write pole in alignment or misalignment with a single bit width track of a storage medium.

FIG. 4 illustrates multiple example instances 400, 402, and 404 of a write pole in alignment or misalignment with a single bit width track 406 of a storage medium, wherein the bit track width 403 contains a sequence of single bits and the data track width (defined by the cross-track width of the write pole and the write bubble) is only large enough to cover one complete bit track width 403. In FIG. 4, arrow 408 indicates the direction of medium travel as the disc spins, such that the magnetic cells (such as magnetic cell 410) are moving left to right relative to the writer instances. It should be understood that the magnetic cells constitute the patterned bits 122 discussed with regard to FIG. 1.

Each write pole instance represents a write pole at different times traveling relative to the surface of the storage medium. Further, each write pole instance is shown positioned at a different alignment with the bit track 406, as compared to each other write pole instance. The write pole instance 402 is misaligned with the bit track 406 in the one cross-track direction, the write pole instance 402 is correctly aligned with the bit track, and the write pole instance 404 is misaligned with the bit track 406 in the other cross-track direction. At each of the positions of the write pole instances 400 and 404, the write pole instance is off track due to a behavior called track misregistration (TMR). That is, the write pole instance has deviated from the intended cross-track position, which is centered above the bit track 406 of the bit patterned medium, a measure of this cross-track deviation can be determined from the TMR value. The portion of the deviation that is repeatable is called repeatable run out (RRO) and can also be determined using information from the readback signal.

As discussed above, the position of the write pole with respect to targeted bits on the BPM can be determined in a variety of ways, such as a read-while-writing scheme, a read-before-writing scheme, or through the use of additional sensors. Once the position of the write pole instance (e.g., the alignment or the magnitude of misalignment) with respect to the bit track 406 on the BPM is determined, the write current (WPE) applied to the write pole instance for the writing process can be modulated to compensate for any deviation of the write pole instance in the cross-track direction.

As the WPE applied to the tip of the write pole is modulated, the magnetic field generated around the tip of the write pole (also known as the "write bubble") changes in the cross-track direction. In this manner, the coverage of the magnetic cells by the write bubble can be expanded in the cross-track direction to account for cross-track deviation of the write pole relative to the target track. Referring again to FIG. 4, in order to compensate for the cross-track deviation experienced by write pole instances 400, 402, and 404, misaligned write pole instances 400 and 404 would be supplied a larger write current than write pole instance 402, which is aligned on the target bit track 406.

It should be understood that changes in the write current can also change the length of the write bubble in the down-track direction. Thus, the contours of the write bubble change in both the cross-track and down-track directions as the amplitude of the write current changes. Accordingly, in some implementations, the timing of the write process may be adjusted to compensate for the change in the size of the write bubble in the down-track direction, so that the writing position is synchronized with the reading position. In one implementation, the trailing edge of the write bubble can be adjusted to coincide with the effective detection area of the read sensor or any other alignment sensor.

It should also be understood that the amplitude of the write current supplied to the write pole is maintained within a range so as to prevent adjacent track interference (ATI), which occurs when the write bubble directed at the target bit track alters the data stored in magnetic cells of an adjacent bit track. For example, the write pole can deviate from the target bit track so much in a cross-track direction that the amplified write bubble overlaps into an adjacent bit track and inadvertently changes data stored in that adjacent bit track. Accordingly, the maximum write current can be limited to prevent such ATI effects.

In FIG. 4, one bit track is written at a time, and there is no particular order to the writing of the bit tracks. In other words, the bit tracks can be accessed and written randomly. Because the contours of the write bubble change as the write current applied to the write pole tip is modulated to compensate for the cross-track deviation, the transition location is also going to shift in the down-track direction due to magnetostatic interaction. This shift is known as a non-linear transition shift (NLTS). To compensate for the NLTS, the timing of the application of the write current is adjusted. This adjustment in the amplitude of the write current and the timing of the application of the write current to compensate for changes in write bubble length is referred to as write precompensation or "precomp." In an implementation, the precomp may be mapped out during drive self-test and stored as a lookup table in non-volatile memory. In another implementation, the precomp may be calculated using firmware, on-head microelectronics, or off-head microelectronics. In still another implementation, the relationships among write current, magnetic bubble cross-track width, cross-track deviation compensation, and down-track synchronization can be determined during drive calibration, and a calibrated read back amplitude may be used to govern appropriate modulation of the write current.

Figure 5:
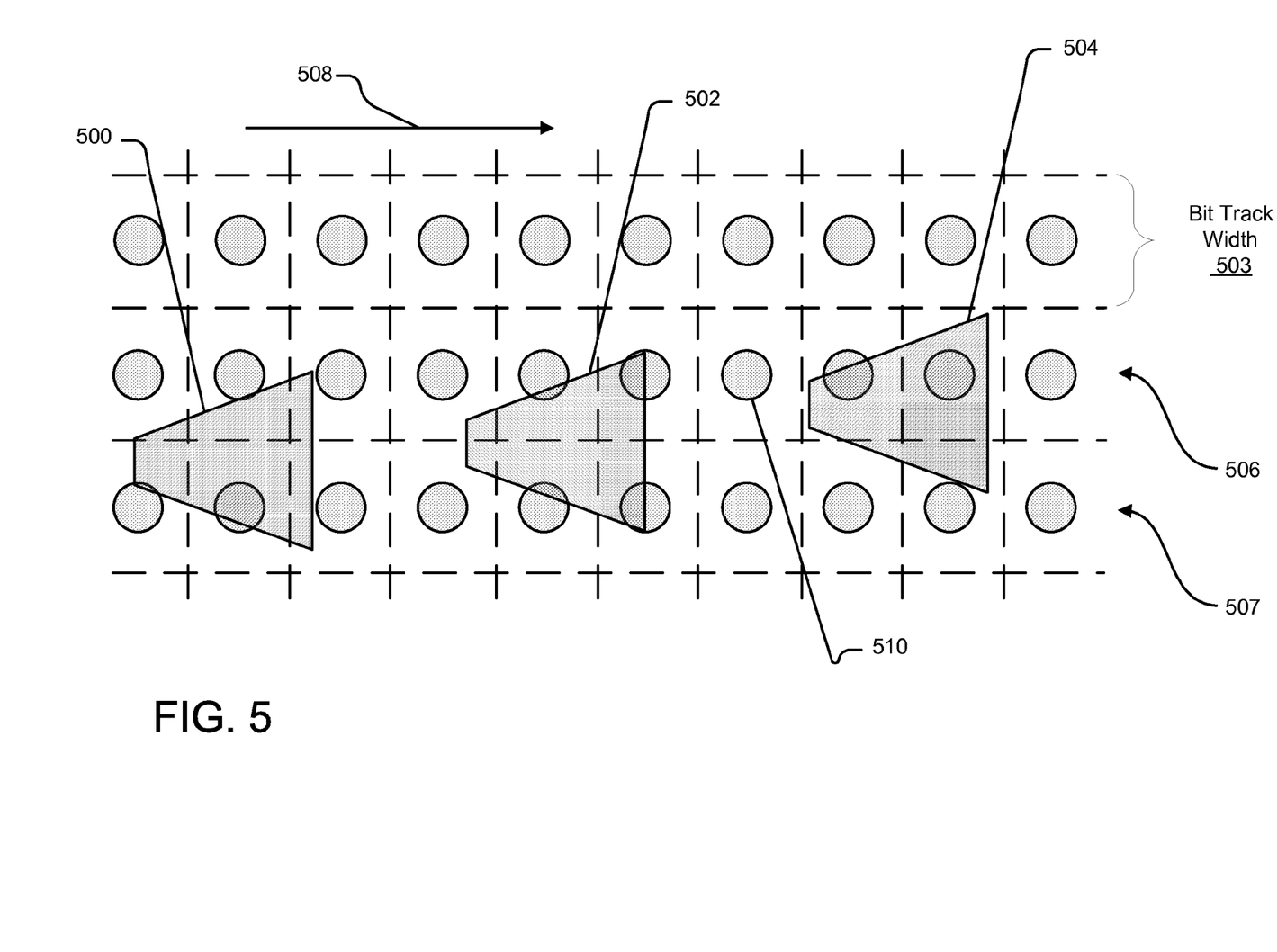
FIG. 5 illustrates multiple example instances of a write pole in alignment or misalignment with multiple bit tracks of a storage medium in a banded configuration.

FIG. 5 illustrates multiple example instances 500, 502, and 504 of a write pole in misalignment with multiple bit tracks 506 and 507 of a storage medium in a banded configuration, wherein the single bit track width 503 contains a sequence of single bits but the data track width (defined by the cross-track width of the write pole and the write bubble) is larger than the single bit track width 503. In FIG. 5, arrow 508 indicates the direction of medium travel as the disc spins, such that the magnetic cells (such as magnetic cell 510) are moving left to right relative to the writer instances. It should be understood that the magnetic cells constitute the patterned bits 122 discussed with regard to FIG. 1.

According to the present invention, a solution at the drive level to the above-mentioned problem with very high to very ultra-high areal recording density bit patterned media and systems is termed "banded technology", also known as the "bandit approach", and comprises utilizing a wider write head than conventionally employed to write the data rings in a single pass, whereby a gain in write field is obtained. However, instead of complete random access of the data rings, this approach requires sequential writing of data rings adjacent a just-written data ring. To accomplish this, when writing a data track the write head will pass over a first data ring and partially pass over ("trim") an adjacent data ring. Since each data track will be written only once before complete erasure, tolerance of erasure from the media side is relatively large. In addition, a wider write head or pole can be utilized and a comparatively narrower data tracks can be written. Less track edge noise is induced since the guard band is practically removed. As a consequence, areal recording density at drive level is increased by a small amount, with loss of only a small amount of media area, which cannot be utilized for data storage. Also, data access is not completely random and the increase in write head width is limited so as to not result in curvature of the trimmed track.

Each write pole instance represents a write pole at different times traveling relative to the surface of the storage medium. Further, each write pole instance is shown positioned at a different alignment with the target bit tracks 506 and 507, as compared to each other write pole instance. In the banded configuration, the write pole instances are designed to be wider than a single bit track. The write pole instance 500 is misaligned with the bit tracks 506 and 507 in the one cross-track direction, the write pole instance 502 is correctly aligned with the bit tracks 506 and 507, and the write pole instance 504 is misaligned with the bit tracks 506 and 507 in the other cross-track direction. At each of the positions of the write pole instances 500 and 504, the write pole instance has deviated from the intended position, which is centered above the bit tracks 506 and 507 of the bit patterned medium. The portion of the deviation that is repeatable is called repeatable run out (RRO) and also can be determined using information from the readback signal. Referring again to FIG. 5, in order to compensate for the cross-track deviation experienced by write pole instances 500, 502, and 504, misaligned write pole instances 500 and 504 would be supplied a larger write current than write pole instance 502, which is aligned on the target bit track 506.

In the banded configuration, each time the write pole writes, the write track width is wider than the intended bit track. As a result, with each write, the write pole at least partially overwrites a fixed portion of the adjacent bit track (e.g., bit track 507) when it writes to the target track (e.g., bit track 506). As a result of this partial overwriting process, the write pole writes information sequentially from adjacent track to adjacent track, rewriting the erased or partially written data in the next adjacent track. As a result, the bit track may be narrower than the actual written data track width. This "banded" or "shingled" approach to writing, therefore, permits higher areal density on the storage medium.

It should also be understood that other magnetic cell patterns may be structurally formed in the storage medium. For example, magnetic cells in adjacent tracks may be staggered to increase the areal density of magnetic cells on the storage medium. The concentric data tracks of magnetic cells are staggered so that the cells in every other adjacent bit track are radially aligned. According to this implementation, the width of the write pole can be much wider than the bit track pitch, for example, about the width of three or more immediately adjacent concentric bit tracks, and a significant write field is achievable even at bit densities on the order of 1 Tbit/in$^2$. As with the implementations shown in FIGS. 4 and 5, write poles having other than trapezoidal wedge shape, e.g., triangular or square shape, and BPM with cells having shapes other than circularly-shaped "dots", e.g., square-shaped and elliptical-shaped, are also contemplated.

Another storage medium configuration with which the described technology may be employed is termed discrete track recording (DTR), in which the storage medium is patterned in the cross-track direction but continuous in the down-track direction. Accordingly, individual bit tracks are patterned in discrete concentric rings about the center of the disc. DTR may be employed using both single bit track width write poles and banded configuration write poles.

Figure 6:
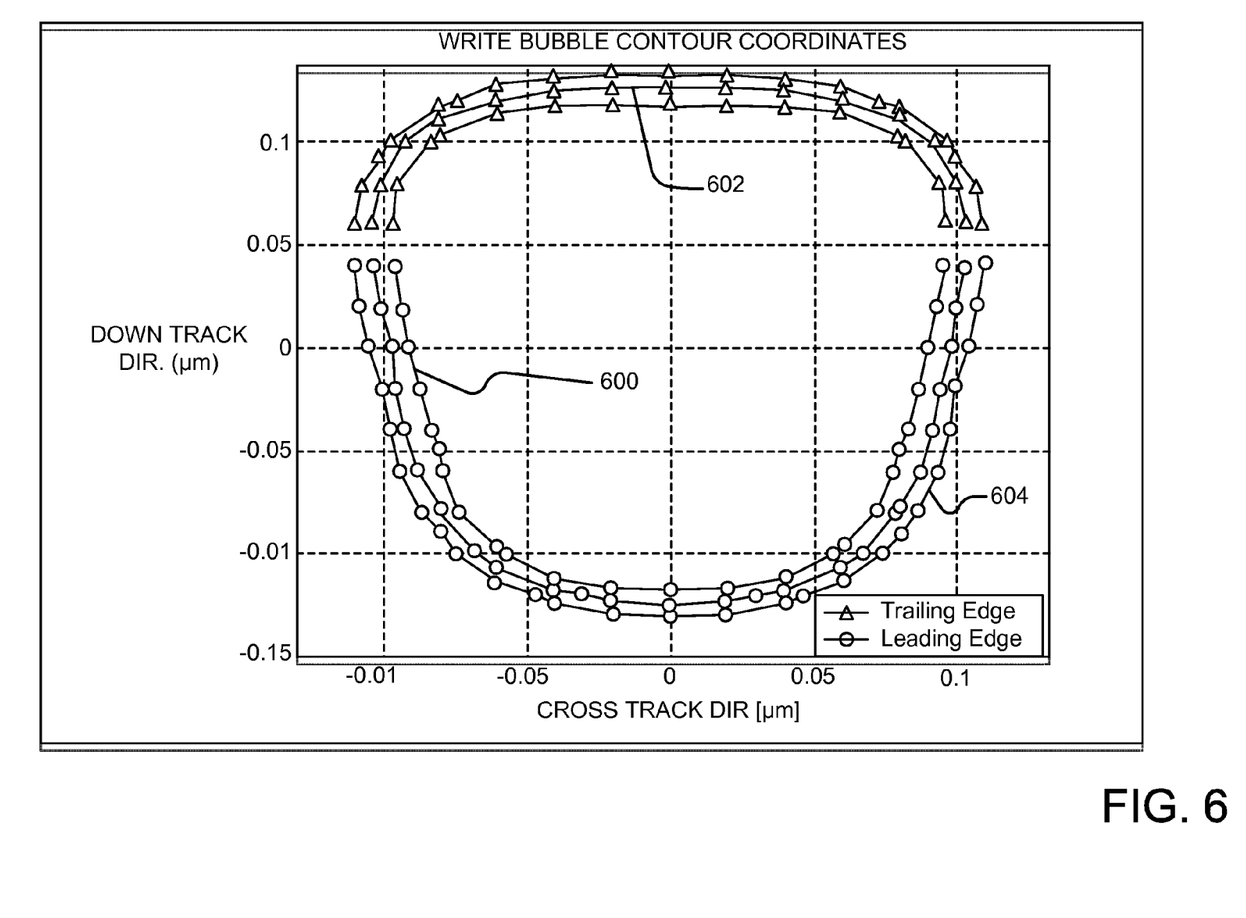
FIG. 6 illustrates example write bubble variations with the application of different write currents.

FIG. 6 illustrates example write bubble data variations 600, 602, and 604 with the application of different write currents. The write bubble data 600 shows the extent of a write bubble having a lower amplitude write current, with the write bubble data 602 being generated from a higher amplitude write current and the write bubble data 604 being generated from an even higher amplitude write current.

By varying the write current amplitude, the storage device can adjust the cross-track width and/or the down-track length of the write bubble to account for cross-track deviations and/or minimize the effective distance between a write pole and a read sensor on a transducer head.

Figure 7:
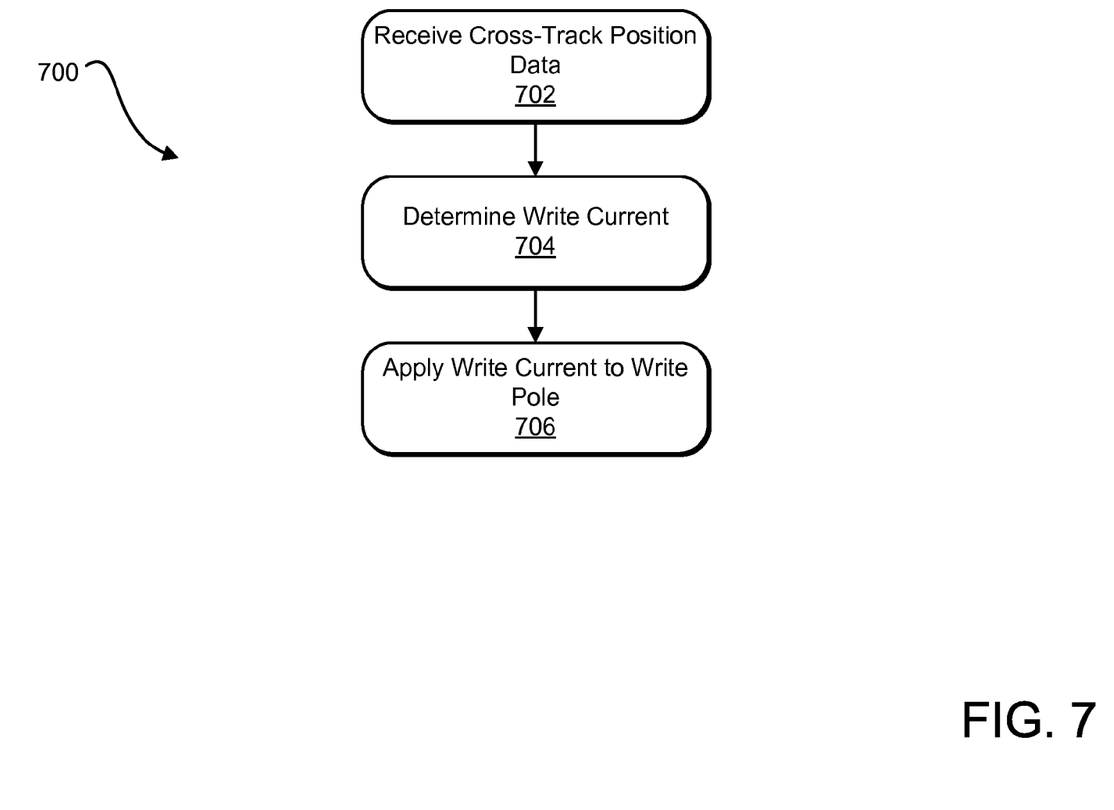
FIG. 7 illustrates a flow chart illustrating example operations for compensating for cross-track deviation of a write pole during a writing operation.

FIG. 7 illustrates a flow chart illustrating example operations 700 for compensating for cross-track deviation of a write pole during a writing operation. In a monitoring operation 702, deviation in the cross-track direction, or "cross-track deviation" is determined. In an implementation, cross-track deviation may be determined by a read-while-writing process or a read-before-writing process, or by use of multiple sensors to determine position.

In a compensating operation 704, the amplitude of the write current is adjusted or modulated to compensate for the cross-track deviation of the writer. Changing the amplitude of the write current alters the contours of the write bubble. Thus, for example, if cross-track deviation increases, the amplitude of the write current is increased so that the size of the write bubble increases in the cross-track direction. If cross-track deviation decreases, the amplitude of the write current is decreased so that the size of the write bubble decreases in the cross-track direction. A similar size adjusting effect occurs in the down-track dimension of the write bubble.

In a writing operation 706, the adjusted write current is applied to the writer so that targeted bits may be written correctly, compensating for any detected or measured cross-track deviation of the transducer head. It should be understood that the timing of the application of the write current may be adjusted to compensate for the change in write bubble length (in the down track direction) as a result of the adjusted write current.

Exemplary operations 700 may be encoded on a computer readable storage medium and/or implemented as logical steps executed by a processor.

While the exemplary implementations herein are applied to bit patterned media, it should be understood that they are also applicable to other types of media, such as patterned media and continuous media, and their respective methods of recording.

The above specification, examples and data provide a complete description of the structures of exemplary implementations of methods and apparatus that may be used to compensate for cross-track deviation. Although various implementations of the apparatus have been described above with a certain degree of particularity, or with reference to one or more individual implementations, those skilled in the art could make numerous alterations to the disclosed implementations without departing from the spirit or scope of this invention. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A method, comprising:
    detecting a cross-track deviation of a writer relative to one or more target tracks on a recording medium to provide a detected cross-track deviation;
    adjusting a write current supplied to a writer based on the detected cross-track deviation to provide an adjusted write current;
    determining a timing compensation based on a non-linear transition shift caused by adjusting the write current based on the detected cross-track deviation;
    adjusting timing of an application of the write current based on the timing compensation.

2. The method of claim 1 wherein adjusting the write current supplied to the writer based on the detected cross-track deviation compensates for the cross-track deviation.

3. The method of claim 1 wherein the detection operation comprises:
    detecting the cross-track deviation of the writer relative to the one or more target tracks using at least one of a read-while-writing process or a read-before-writing process.

4. The method of claim 1 wherein the detection operation comprises:
    detecting the cross-track deviation of the writer relative to the one or more target tracks using multiple read sensors.

5. The method of claim 1 wherein the detection operation comprises:
    detecting the cross-track deviation of the writer relative to the one or more target tracks using a spin angular momentum sensor.

6. The method of claim 1, wherein the adjusting the write current operation adjusts a cross-track width of a magnetic write bubble generated by the writer.

7. The method of claim 1, wherein the adjusting the write current operation adjusts a down-track length of a magnetic write bubble generated by the writer to synchronize the writer with a read sensor.

8. The method of claim 1 wherein magnetic cells in the one or more target tracks are organized in a staggered fashion.

9. The method of claim 1 wherein the writer operates relative to the one or more target tracks in accordance with a banded approach.

10. A system comprising:
    alignment sensor circuitry configured to detect a cross-track deviation of a writer relative to one or more target tracks on a recording medium; and
    write current control circuitry configured to adjust a write current supplied to the writer based on the detected cross-track deviation and configured to adjust timing of an application of the write current;
    wherein the adjusted timing of the application of the write current compensates for a non-linear transition shift caused by an adjustment to the write current based on the detected cross-track deviation.

11. The system of claim 10 wherein the write current control circuitry is further configured to adjust the write current supplied to the writer based on the detected cross-track deviation in compensation for the cross-track deviation.

12. The system of claim 10 wherein the alignment sensor circuitry is further configured to detect the cross-track deviation using at least one of a read-while-writing process or a read-before-writing process.

13. The system of claim 10 wherein the alignment sensor circuitry is further configured to detect the cross-track deviation using multiple read sensors.

14. The system of claim 10 wherein the alignment sensor circuitry is further configured to detect the cross-track deviation using a spin angular momentum sensor.

15. The system of claim 10 wherein the write current control circuitry is further configured to adjust a cross-track width of a magnetic write bubble generated by the writer by adjusting the write current.

16. The system of claim 10, wherein the write current control circuitry is further configured to adjust a down-track length of a magnetic write bubble generated by the writer to synchronize the writer with a read sensor.

17. The system of claim 10 wherein magnetic cells in the one or more target tracks are organized in a staggered fashion.

18. The system of claim 10 wherein the writer is configured to operate relative to the one or more target tracks in accordance with a banded approach.

19. One or more non-transitory computer-readable storage media storing instructions that, when executed, direct a processor to:
    detecting a cross-track deviation of a writer relative to one or more target tracks on a recording medium to provide a detected cross-track deviation;
    adjusting a write current supplied to a writer based on the detected cross-track deviation to provide an adjusted write current;
    determining a timing compensation based on a non-linear transition shift caused by adjusting the write current based on the detected cross-track deviation;
    adjusting timing of an application of the write current based on the timing compensation.

20. The one or more non-transitory computer-readable storage media of claim 19 wherein adjusting the write current supplied to the writer based on the detected cross-track deviation compensates for the cross-track deviation.

\* \* \* \* \*